United States Patent
Bates et al.

(10) Patent No.: US 10,156,723 B2
(45) Date of Patent: Dec. 18, 2018

(54) DISPLAY PRE-DISTORTION METHODS AND APPARATUS FOR HEAD-MOUNTED DISPLAYS

(71) Applicant: Google Inc., Mountain View, CA (US)

(72) Inventors: John Paul Bates, Redwood City, CA (US); Hendrik Wagenaar, Mountain View, CA (US)

(73) Assignee: Google LLC, Mountain View, CA (US)

(*) Notice: Subject to any disclaimer, the term of this patent is extended or adjusted under 35 U.S.C. 154(b) by 165 days.

(21) Appl. No.: 15/153,125

(22) Filed: May 12, 2016

(65) Prior Publication Data

US 2017/0329136 A1 Nov. 16, 2017

(51) Int. Cl.
*G02B 27/01* (2006.01)
*G06T 3/00* (2006.01)
*G02B 27/00* (2006.01)

(52) U.S. Cl.
CPC ..... *G02B 27/0172* (2013.01); *G02B 27/0093* (2013.01); *G06T 3/0093* (2013.01); *G02B 2027/011* (2013.01); *G02B 2027/014* (2013.01); *G02B 2027/0116* (2013.01)

(58) Field of Classification Search
CPC combination set(s) only.
See application file for complete search history.

(56) References Cited

U.S. PATENT DOCUMENTS

| | | | |
|---|---|---|---|
| 5,369,450 A | 11/1994 | Haseltine et al. | |
| 7,965,325 B2 * | 6/2011 | Imamura | G06T 3/0062 348/241 |
| 8,824,779 B1 * | 9/2014 | Smyth | G06K 9/0061 382/100 |
| 2013/0050833 A1 * | 2/2013 | Lewis | G06F 9/451 359/630 |
| 2015/0035744 A1 * | 2/2015 | Robbins | G02B 27/017 345/156 |
| 2016/0091720 A1 * | 3/2016 | Stafford | G02B 27/0172 345/8 |
| 2016/0140773 A1 * | 5/2016 | Yajima | G02B 27/017 345/633 |
| 2016/0314564 A1 * | 10/2016 | Jones | G06T 15/04 |
| 2016/0353094 A1 * | 12/2016 | Rougeaux | H04N 13/0425 |

FOREIGN PATENT DOCUMENTS

WO 2017/196405 A1 11/2017

OTHER PUBLICATIONS

International Search Report and Written Opinion for PCT Application No. PCT/US2016/068545, dated Feb. 22, 2017, 12 pages.
Rolland, et al., "A Method of Computational Correction for Optical Distortion in Head-Mounted Displays", Dept. of Computer Science, University of North Carolina, Dec. 31, 1993, 14 pages.

* cited by examiner

*Primary Examiner* — Aneeta Yodichkas
*Assistant Examiner* — Deeprose Subedi
(74) *Attorney, Agent, or Firm* — Brake Hughes Bellermann LLP

(57) ABSTRACT

Display pre-distortion methods and apparatus for HMDs are disclosed. A disclosed example method includes determining a position of a pupil relative to a lens of the head-mounted display (HMD), determining, based on the determined position, a pre-distortion map for an image to be displayed on a display screen of the HMD, and displaying the image on the display screen of the HMD, wherein the image is modified by the pre-distortion map.

17 Claims, 11 Drawing Sheets

| ORIG. PIXEL LOCATION | COLOR | DEST. PIXEL LOCATION |
|---|---|---|
| (X1,Y1) | BLUE | (X2,Y2) |
| (X1,Y1) | RED | (X3,Y3) |
| ⋮ | ⋮ | ⋮ |

FIG. 13

DISPLAY PRE-DISTORTION METHODS AND APPARATUS FOR HEAD-MOUNTED DISPLAYS

FIELD OF THE DISCLOSURE

This disclosure relates generally to head-mounted displays (HMDs) and, more particularly, to display pre-distortion methods and apparatus for HMDs.

BACKGROUND

Head-mounted displays include, among other things, a display that enables a wearer to be visually immersed in, for example, a three-dimensional (3D) virtual experience.

SUMMARY

Display pre-distortion methods and apparatus for HMDs are disclosed. A disclosed example method includes determining a position of a pupil relative to a lens of the head-mounted display (HMD), determining, based on the determined position, a pre-distortion map for an image to be displayed on a display screen of the HMD associated with the pupil, and displaying the image on the display screen of the HMD, wherein the image is modified by the pre-distortion map.

A disclosed example HMD includes a lens, an eye tracker to determine a position of a pupil relative to the lens, a processor programmed to determine, based on the determined position, a pre-distortion map for an image to be displayed on a display screen associated with the HMD and with the pupil, and a display to display the image on the display screen associated with the HMD, wherein the image is modified by the pre-distortion map.

A disclosed example non-transitory machine-readable media stores machine-readable instructions that, when executed, cause a machine to at least determine a position of a pupil relative to a lens of the head-mounted display (HMD), determine, based on the determined position, a pre-distortion map for an image to be displayed on a display screen of the HMD associated with the pupil, and display the image on the display screen of the HMD, wherein the image is modified by the pre-distortion map.

BRIEF DESCRIPTION OF THE DRAWINGS

FIG. 13 is an example table representing a pre-distortion map.

DETAILED DESCRIPTION

Figure 1:
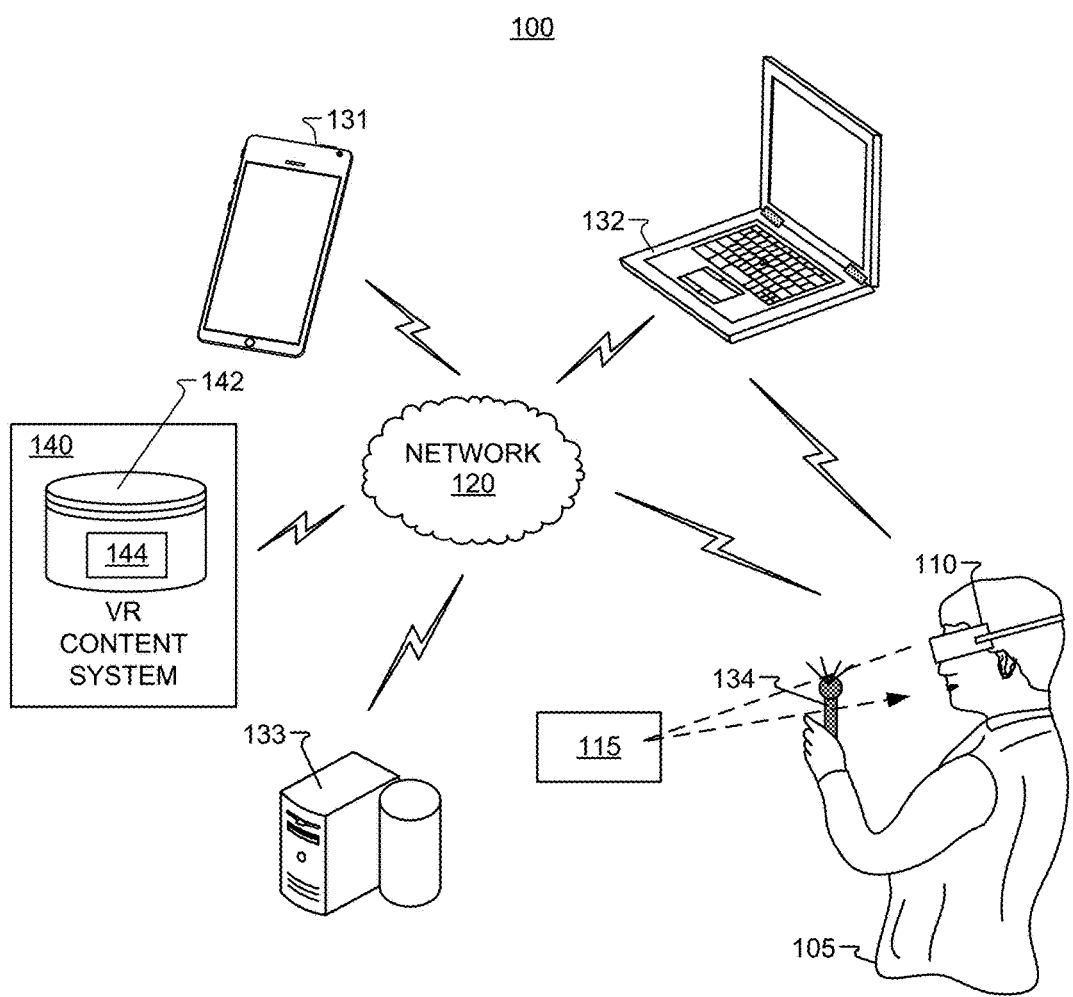
FIG. 1 is a schematic illustration of an example VR environment in accordance with the teachings of this disclosure.

Virtual reality (VR) head-mounted displays (HMDs) are commonly designed to laterally space lenses (e.g., one per eye) apart by a distance corresponding to an average (e.g., expected, anticipated, etc.) inter-pupillary distance (IPD). Displays (e.g., one per eye) are likewise laterally separated by the average IPD. Even if the separation of the lenses of an HMD matches the IPD of a wearer, it can be difficult to align lenses with the wearer's eye positions. These mismatches can lead to offsets such as the user's eyes being too low, too high, off to a side, close together, too far apart, and/or uneven, with respect to the lenses. Such mismatches can result in, for example, discomfort, headaches, double vision, etc. Additionally or alternatively, one or more of the lenses may have chromatic aberrations that can result in, for example, the user seeing colored halos around objects.

Example display pre-distortion methods and apparatus for HMDs that can overcome at least these problems are disclosed herein. The examples disclosed herein use a pre-distortion map that causes pixels to be displayed (e.g., output, presented, etc.) at different locations than their normal position. For example, if a wearer's pupil is off center optically, as compared or relative to an average pupil position, then a display can be pre-distorted (e.g., modified) according to a pre-distortion map that causes pixels to be displayed by the display correspondingly off center. An example pre-distortion map shown in FIG. 13 defines that a blue pixel at a first pixel location (X1, Y1) should instead be displayed at a second pixel location (X2, Y2). The example map also defines that a red pixel at the first pixel location (X1, Y1) should instead be displayed at a third pixel location (X3, Y3). In use, the pre-distortion map can be applied by performing table lookups for pixel/color combinations to identify where the pixel/color combinations should be displayed.

By displaying the pixels off center, what is displayed by the display is pre-distorted such that they better align with the pupil's view frustum. Likewise, what is displayed can be pre-distorted to compensate for chromatic aberration, electronic device stabilization, etc. The display can additionally be pre-distorted to compensate for the display being flat while a wearer's field of vision is spherical. The display can further be pre-distorted to accommodate lens distortion. The pre-distortion map(s) can be dynamically adapted (e.g., for each frame) as the user wears an HMD according to their changing pupil location. Pupil or eye location can be determined using eye tracking in an HMD. The pre-distortion map can be computed using ray tracing that takes into account the design characteristics of the HMD such as, but not limited to, lens placement, lens refractive index, lens geometry, display placement, color channel frequencies and display geometry. The examples disclosed herein may also be used to help a user adjust their HMD to their pupil location.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s). These examples and variants and portions thereof shown in the attached drawings are not drawn to scale, with specific shapes, or with specific relative dimensions as they are not important to this disclosure and may render the drawings more difficult to comprehend. Specific elements may have been intentionally exaggerated for discussion purposes. Instead, the drawings have been drawn for clarity and comprehension. Further, the arrangement of elements and couplings may be changed, rearranged, etc. according to other implementations of this disclosure and the claims herein. Moreover, any use of terms such as up, down, top, bottom, side, end, front, back, etc. herein are used with reference to a currently considered or illustrated orientation. If they are considered with respect to another orientation, it should be understood that such terms must be correspondingly modified.

Turning to FIG. 1, a block diagram of an example VR system 100 is shown. The example VR system 100 includes a user 105 wearing an HMD 110 in accordance with the teachings of this disclosure. In general, the example VR system 100 provides a VR environment and VR content that can be accessed, viewed, and/or otherwise interacted with.

As shown in FIG. 1, the example VR system 100 includes a plurality of computing and/or electronic devices that can exchange data over a network 120. The devices may represent clients or servers, and can communicate via the network 120 or any other additional and/or alternative network(s). Example client devices include, but are not limited to, a mobile device 131 (e.g., a smartphone, a personal digital assistant, a portable media player, etc.), an electronic tablet (not shown), a laptop or netbook 132, a camera (not shown), the HMD 110, a desktop computer 133, a VR controller 134, a gaming device (not shown), and any other electronic or computing devices (not shown) that can communicate using the network 120 or other network(s) with other computing or electronic devices or systems, or that may be used to access VR content or operate within a VR environment. The devices 110 and 131-134 may represent client devices. In some examples, the devices 110 and 131-134 include one or more processors and one or more memory devices, which can execute a client operating system and one or more client applications. The HMD 110 or the other devices 131-133 may be implemented by the example computing devices 1200 and 1250 of FIG. 12.

Figure 2A:
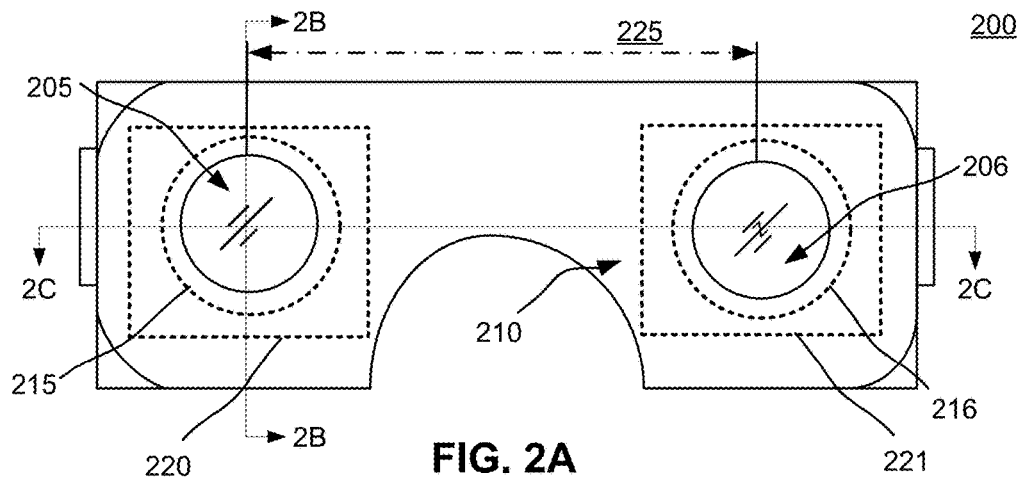
FIG. 2A is a rear view of an example HMD display in accordance with the teachings of this disclosure that may be used to implement the example HMD display of FIG. 1.
Figure 2B:
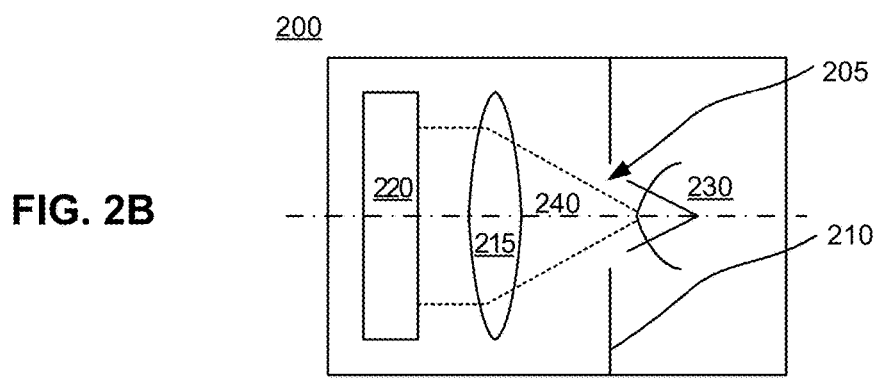
FIG. 2B is a side cross-sectional view of the example HMD display of FIG. 2A taken along line 2B-2B.
Figure 2C:
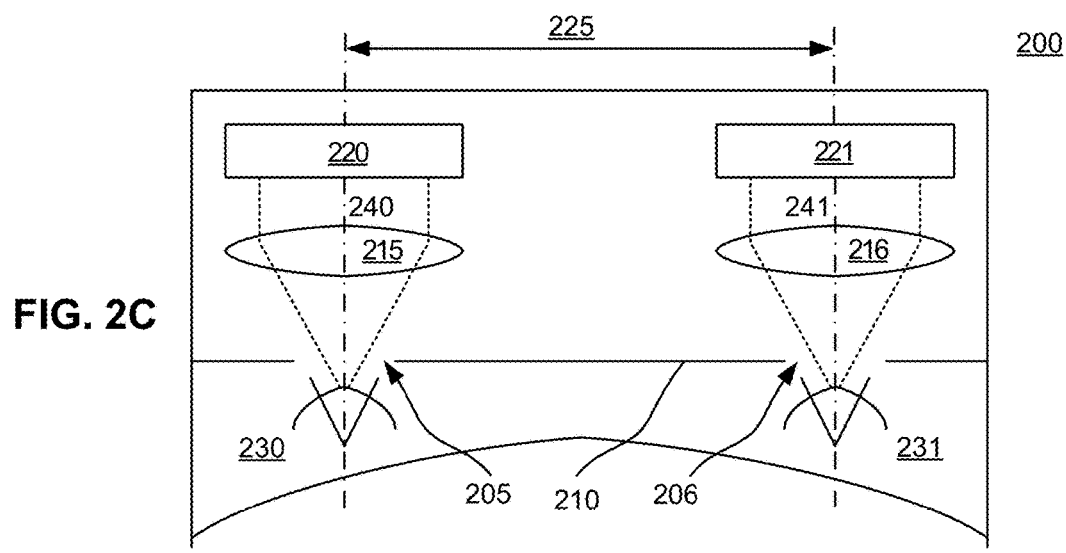
FIG. 2C is a top cross-sectional view of the example HMD display of FIG. 2A taken along line 2C-2C.

FIG. 2A is a rear view of an example HMD 200 that made be used to implement the example HMD 110 of FIG. 1 in accordance with the teachings of this disclosure. FIG. 2B is a side cross-sectional view of the HMD 200 taken along line 2B-2B of FIG. 2A. FIG. 2C is a top cross-sectional view of the HMD 200 taken along line 2C-2C of FIG. 2A. The example HMD 200 of FIGS. 2A-C has a pair of apertures 205 and 206 defined through a rear surface 210 for respective ones of a pair of lenses 215 and 216, and respective ones of a pair of displays 220 and 221. As shown in FIGS. 2B and 2C, the lenses 215 and 216 are positioned between the apertures 205 and 206 and the displays 220 and 221. The lens 215 and display 220 are laterally separated from respective ones of the lens 215 and display 221 by a distance 225. In some examples, the distance 225 is selected to correspond to the average IPD between the two eyes 230 and 231 of a wearer of the HMD 200. An example distance 225 is selected to be between 62 to 65 millimeters (mm). In some examples, the displays 220 and 221 are spaced apart from their respective lens 215, 216 by 20 mm, and the lenses 215 and 216 are spaced apart from their respective aperture 205, 206 by 15 mm. However, other separations may be selected based on the optical design of the HMD 200. The example HMD 200 of FIGS. 2A-C may be implemented by the example computing devices 1200 and 1250 of FIG. 12.

Figure 3:
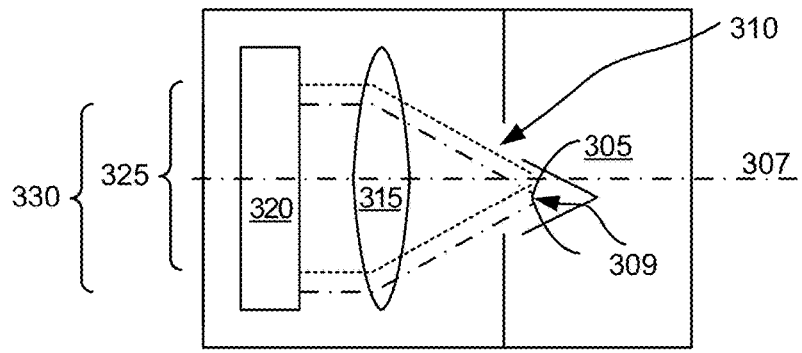
FIG. 3 illustrates an example distortion due to a pupil offset.

In the example of FIGS. 2A-C, the pupils of the eyes 230 and 231 are aligned with their respective aperture 205, 206, and no chromatic aberration is present. In other words, the wearer's eyes 230, 231 are aligned with the optical axes 240, 241 of respective ones of their lenses 215, 216 and displays 220, 221. However, as shown in FIG. 3, a wearer's eye 305 may be misaligned with its respective optical axis 307 of an HMD due to, for example, a different IPD than anticipated, a misalignment of an HMD to the wearer's face, etc. In other words, the eye point 309 (e.g., center of pupil opening) of the wearer's eye 305 is not aligned with the optical axis 307. As shown in the example side cross-sectional view of FIG. 3, the wearer's eye 305 is positioned below the optical axis 307 of the lens 315 and the display 320. The eye 305 may, additionally or alternatively, be offset upward, rightward, or leftward relative to the lens 315. Accordingly, information displayed in a normally used portion 325 of the display 320 (see also FIG. 4) impinges higher on the eye 305 than intended, which can cause, among other things, eye discomfort, headaches, double vision, etc. Said another way, the offset of the eye 305 causes information displayed in another portion 330 of the display 320 to impinge on the pupil of the eye 305. Thus, a user cannot correctly see all of the information displayed in the normally used portion 325. Accordingly, the pre-distortion maps described herein can be used to cause information normally displayed in the portion 325 to instead be displayed downward in the portion 330 such that the information now impinges the eye 305 as intended. For instance, an example pre-distortion map causes the blue (B) pixel at location 405 to instead emanate from pixel location 410.

Figure 4:
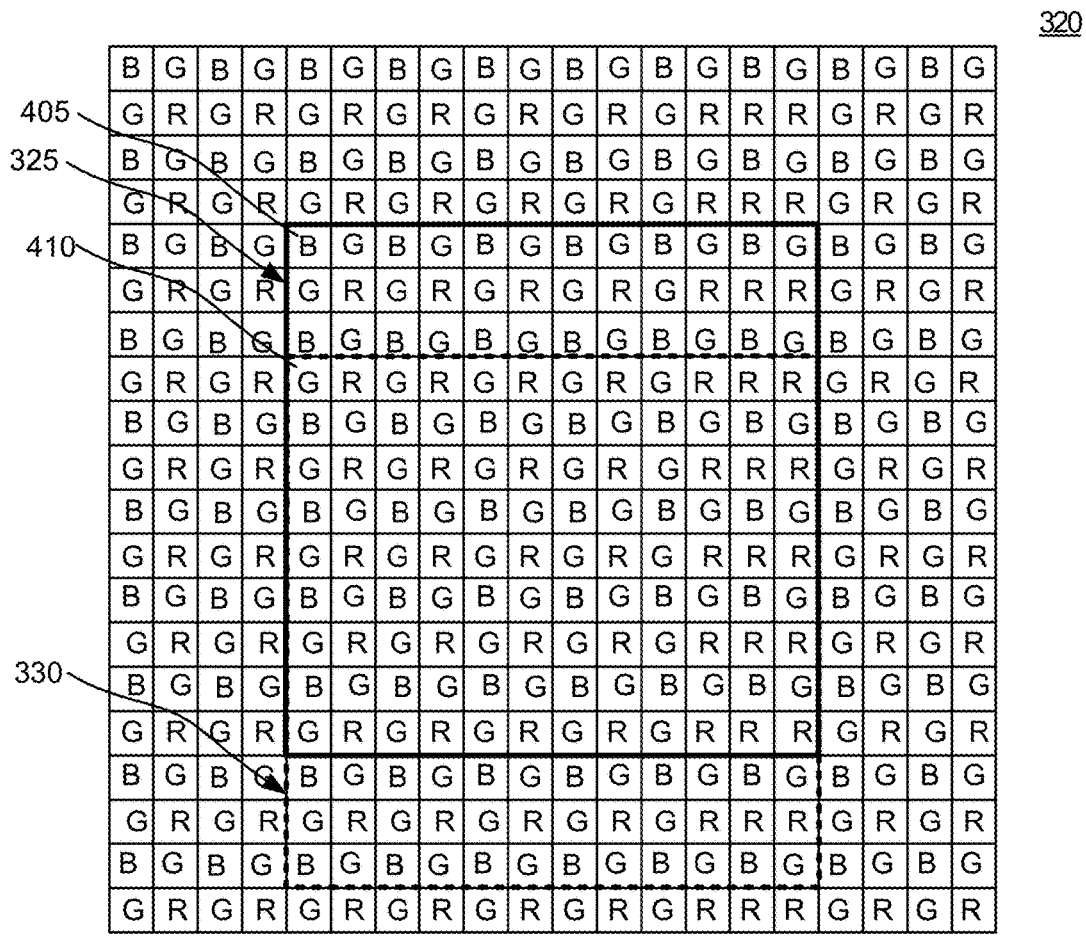
FIG. 4 illustrates an example pre-distortion in accordance with the teachings of this disclosure to compensate a shifted pupil location.

Generally, the normally used portion 325 is dimensioned for an average sized pupil and view frustum. However, it may be designed to have other dimensions. As shown in FIG. 4, the display 320 is larger than the portion 325 to accommodate, among other things, field of view (e.g., looking right, left, up, and down), anticipated eye 305 aperture 310 offsets, IPD differences, HMD manufacturing tolerances, etc. In some examples, the display is 100 pixels by 100 pixels.

Figure 6:
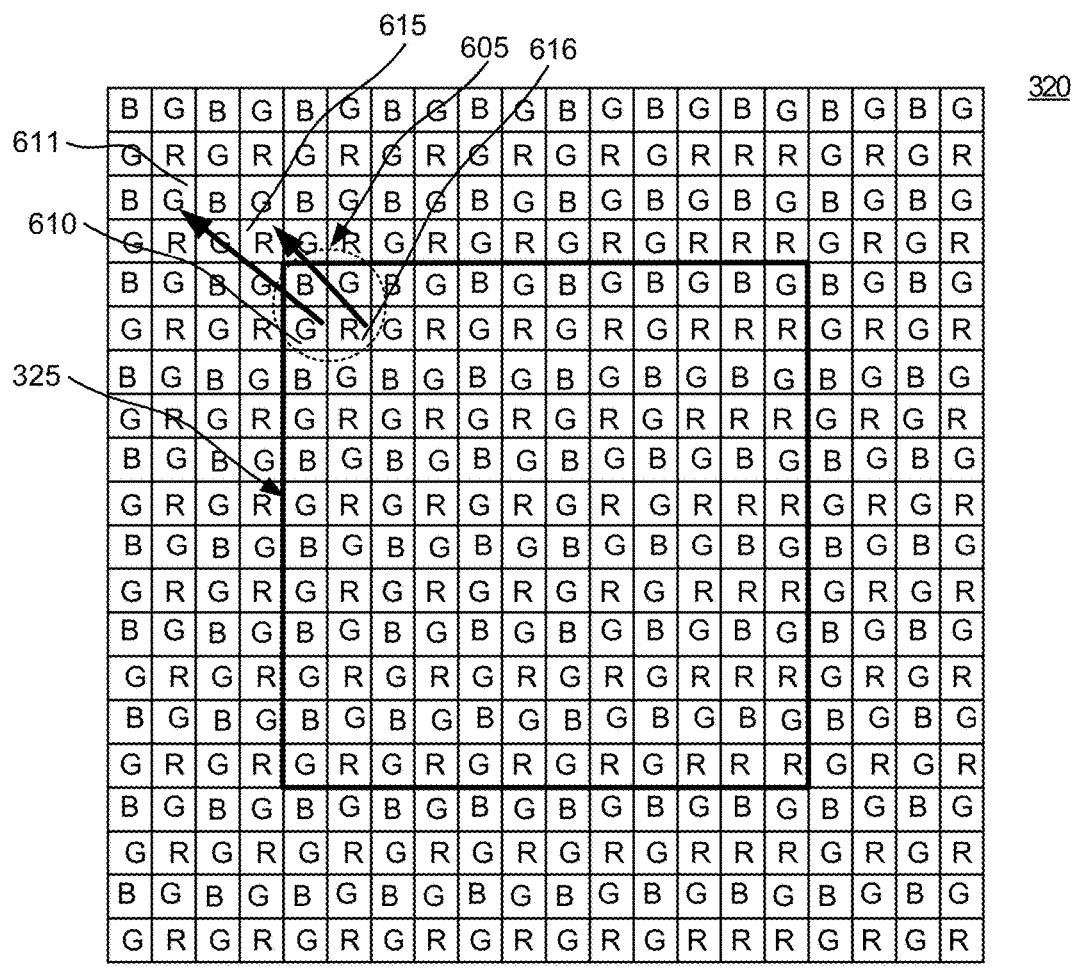
FIG. 6 illustrates an example pre-distortion in accordance with the teachings of this disclosure to compensate a chromatic aberration

While the example display of FIGS. 4 and 6 implements a Bayer pattern, displays implementing other patterns may also be used with the examples disclosed herein.

Figure 5:
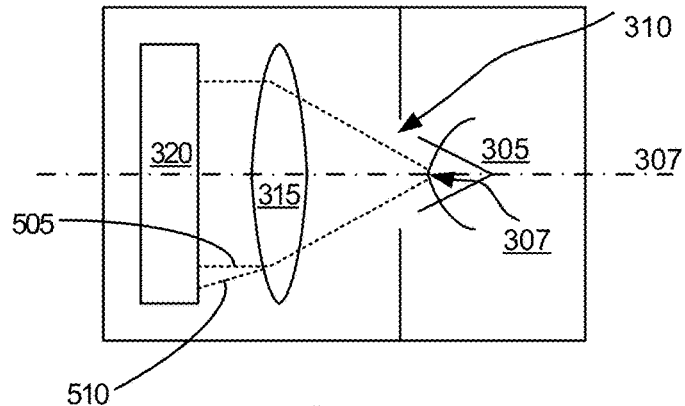
FIG. 5 illustrates an example chromatic aberration due to a lens distortion.

As shown in FIG. 5, the lens 315 can cause chromatic aberration due to, for example, dispersion. Chromatic aberration occurs when the lens 315 is unable to focus all the colors emanating from the same location onto the same eye point. While the example display 320 of FIG. 6 does not have an overlapping red (R), green (G) and B pixel triplet, for sake of explanation, it will be considered that they overlap even though they will impinge at slightly different locations on the eye 305. The lack of color convergence due to chromatic aberration is generally larger than that caused by non-overlapping R, G and B pixels.

Example chromatic aberration is illustrated in the side cross-sectional view of FIG. 5 as two rays 505 and 510 of different colors (e.g., red, blue, green, etc.) that emanate from different locations on the display 320 but are both focused by the lens 315 onto generally the eye point at the eye 305. Accordingly, the pre-distortion maps described herein can be used to cause color information normally displayed at the same location 605 (see FIG. 6) to instead be displayed at different locations such that the color information now impinges the eye 305 as intended. For example, an example pre-distortion map causes green displayed at pixel location 610 to instead be displayed at pixel at location 611, and red displayed at pixel location 615 to instead be displayed at pixel location 616.

Figure 7:
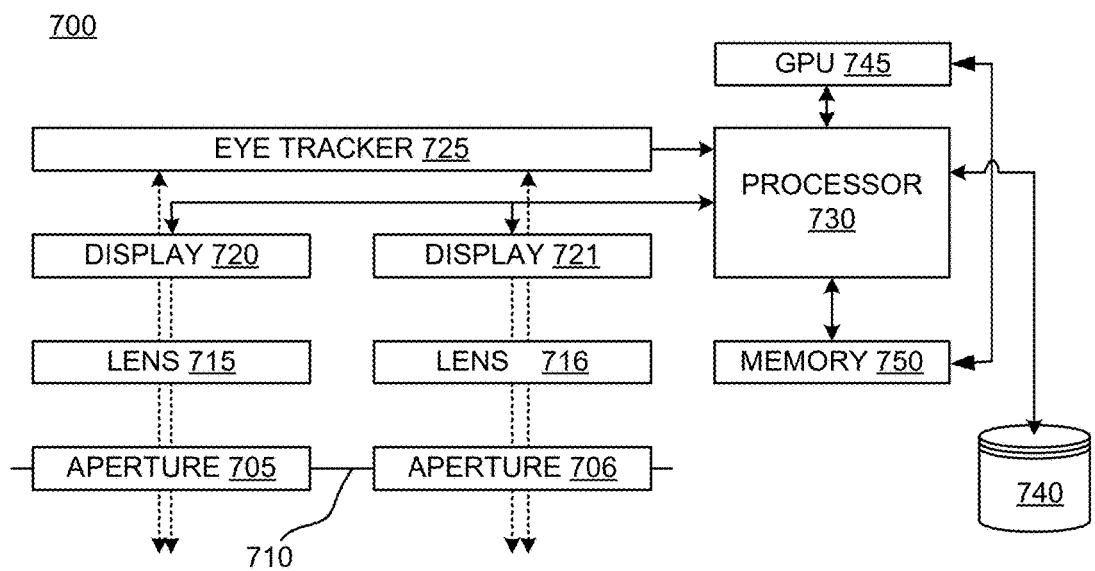
FIG. 7 is a schematic illustration of an example manner of implementing an HMD in accordance with the teachings of this disclosure.

FIG. 7 illustrates an example manner of implementing the example HMDs 110 and 200 in accordance with the teachings of this disclosure. The example HMD 700 of FIG. 7 may be implemented by the example computing devices 1200 and 1250 of FIG. 12. The example HMD 700 of FIG. 7 has a pair of apertures 705 and 706 defined through a rear surface 710 for respective ones of a pair of lenses 715 and 716, and a pair of displays 720 and 721. As discussed above in connection with FIGS. 2B and 2C, the lenses 715 and 716 are positioned between the apertures 705 and 706 and the displays 720 and 721. The lens 715 is laterally separated from the lens 716 by the average IPD between the two eyes of a wearer of the HMD 700.

To locate the pupils of a wearer of the HMD 700, the example HMD 700 of FIG. 7 has an eye tracker 725 implemented using any number of components, devices, lenses, cameras, algorithms, methods, etc. The example tracker 725 provides the coordinates of the pupils of the wearer to a processor 730 such as a central processing unit (CPU), a graphics processing unit (GPU), a digital signal processor (DSP), an ASIC, an FPGA, etc.

For each eye, the processor 730 uses the pupil location to determine a pre-distortion map to apply. The pre-distortion map defines for each pixel to be displayed in the normally used portion 325 (e.g., see FIG. 4) where the pixel should instead be displayed so that the pixel impinges on the intended location on the pupil, as discussed above in connection with at least FIGS. 3 and 4. If a pixel displays overlapping color information, then the pre-distortion map would also provide pre-distortion information for each color of a pixel, as discussed above in connection with at least FIGS. 5 and 6.

In some examples, the HMD 700 has a database 740 of pre-distortion maps for respective ones of pupil locations and colors. An example manner of representing a pre-distortion map is shown in FIG. 13 and discussed in connection with FIG. 9. In some examples the database 740 is pre-computed and/or pre-loaded with pre-distortion maps. In some examples, the database 740 is pre-computed and pre-loaded during manufacture, by the HMD 700, or by a computing device coupled to the HMD 700 upon initial power-up of the HMD 700. In some examples, pre-distortion maps are computed in real-time by the processor 730, a graphics processing unit (GPU) 745, a computing device coupled to the HMD 700, or any combination thereof as pupil locations are received from the eye tracker 725 by the processor 730. The pre-distortion maps stored in the database 740 may correspond to a set of pupil positions. When a measured pupil position is between two of the set of pupil positions, a pre-distortion map can be determined by interpolating between the two pre-distortion maps corresponding to the two pupil positions. In some examples, pupil location offsets of 10 pixels are used.

As discussed below, the eye tracking information and ray tracing can be used to determine pre-distortion maps either by the HMD 700 or elsewhere. In an example, the processor 730 computes pre-distortion maps using ray tracing information generated by the GPU 745. In some examples, the processor 730 and the GPU 745 share a memory 750. The pre-distortion maps for one eye may be different from the pre-distortion maps for the other eye.

An example method of pre-distorting an image is to modify the image stored in the memory 750. For each pixel to be displayed, a currently determined pre-distortion map is queried to determine where the pixel should instead be displayed. The pre-distortion mapping information for that pixel is used to move the pixel to its pre-distorted location in the memory. In some instances, a pre-distortion map may indicate that a pixel is not to be displayed. Once all pixels have been processed, the pre-distorted (e.g., modified) image is sent to the display 720, 721 for output to a wearer of the HMD 700. The pre-distortion mapping may be performed by, for example, the processor 730, the GPU 745, a computing device coupled to the HMD 700, or another device of the HMD 700.

The processor 730 can use eye tracking to help a wearer align the HMD with their eyes. For example, if their eyes are not aligned with the HMD, the processor 730 can notify the wearer of the misalignment via the displays 720 and 721 and provide an indicator of alignment to help them align their eyes with the HMD. The indicator can represent which way(s) the wearer should adjust or move the HMD.

One or more of the elements and interfaces shown in FIGS. 1, 2A-C, 3, 5 and 7 may be combined, divided, re-arranged, omitted, eliminated and/or implemented in any other way. Further, one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. can be used. Moreover, more interfaces and/or elements may be included instead of, or in addition to, those shown, and/or may include more than one of any or all of the illustrated interfaces and elements. The elements shown may, for example, be implemented as machine-readable instructions carried out by one or more processors. A processor, a controller and/or any other suitable processing device such as processor 1202 or processor 1252 shown in FIG. 12 may be used, configured and/or programmed to execute and/or carry out the examples disclosed herein including, but not limited to the HMD 100, the HMD 200, and the HMD 700. For example, the disclosed examples may be embodied in program code and/or machine-readable instructions stored on a tangible and/or non-transitory computer-readable medium accessible by a processor, a computer and/or other machine having a processor, such as that discussed below in connection with FIG. 12. Machine-readable instructions comprise, for example, instructions that cause a processor, a computer and/or a machine having a processor to perform one or more particular processes. Many other methods of implementing the disclosed examples may be employed. For example, the order of execution may be changed, and/or one or more of the blocks and/or interactions described may be changed, eliminated, sub-divided, or combined. Additionally, any or the entire example may be carried out sequentially and/or carried out in parallel by, for example, separate processing threads, processors, devices, discrete logic, circuits, etc.

Figure 8:
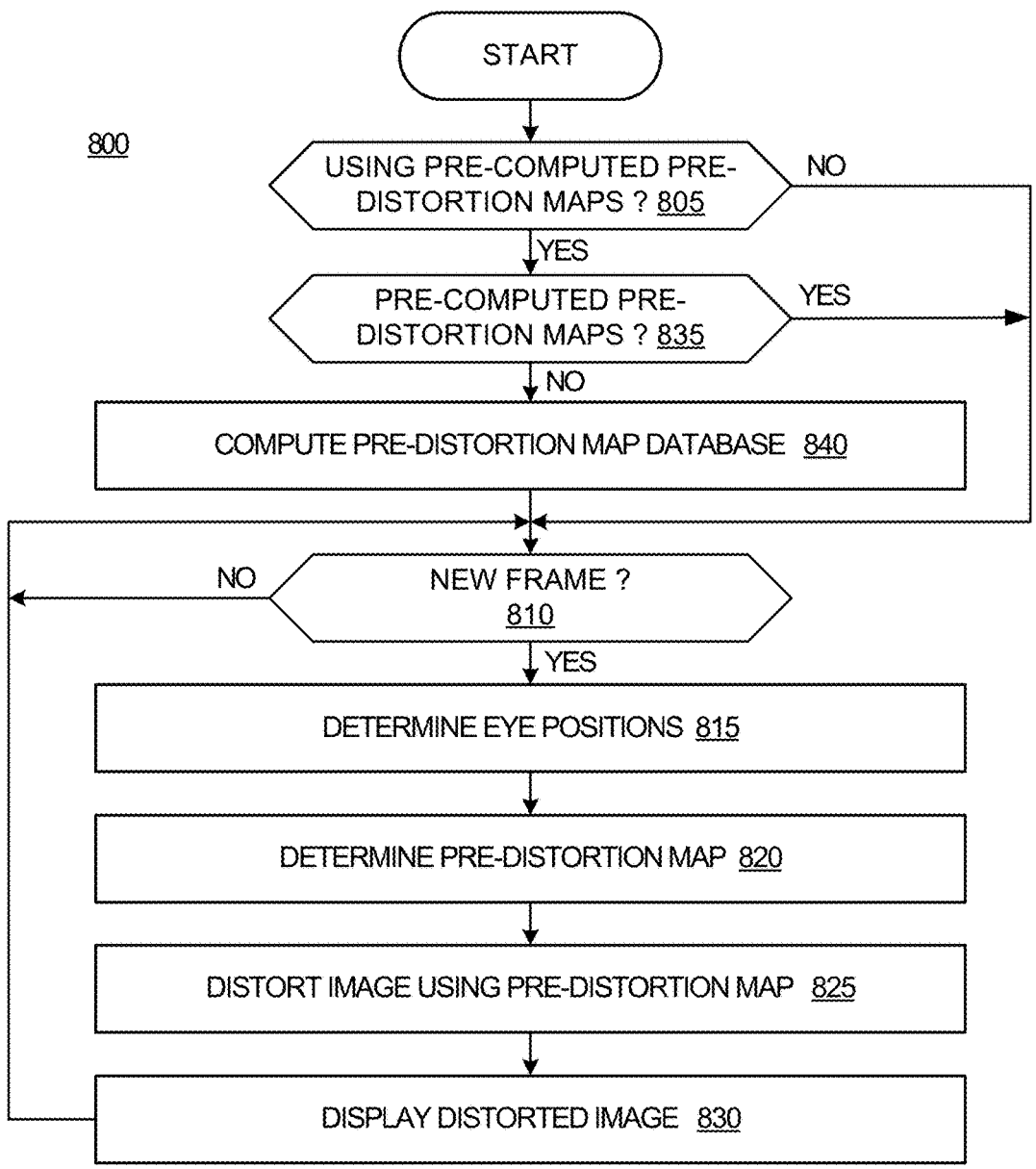
FIG. 8 is a flowchart illustrating an example method that may, for example, be implemented using machine-readable instructions executed by one or more processors to perform a pre-distortion.

Turning to FIG. 8, an example method 800 that may be performed to pre-distort an image frame to be displayed is shown. The example method 800 includes an HMD (e.g., the example HMD 700) determining if pre-computed pre-distortion maps are being used (block 805). If pre-computed pre-distortion maps are not being used (block 805), the HMD waits for a new image frame (block 810). When the new image frame occurs (block 810), the HMD (e.g., the example processor 730) obtains the position of each eye from, for example, an eye tracker (e.g., the tracker 725) (block 815).

The HMD determines a pre-distortion map by, for example, obtaining the pre-distortion map from a database of pre-distortion maps (if pre-computed pre-distortion maps are being used), interpolating pre-distortion maps, computing the pre-distortion map in real-time using ray tracing, etc. (block 820). The image frame for each eye is pre-distorted (e.g., modified) according to its pre-distortion map, etc. by, for example, carrying out the example process 900 of FIG. 9 (block 825), and the pre-distorted image frames are displayed to the user (block 830). Control returns to block 810 to wait for the next image frame.

Returning to block 805, if pre-computed pre-distortion maps are being used (block 805), it is determined whether pre-computed pre-distortion maps are already available (block 835). If they are not available (block 835), then a set of pre-distortion maps are computed (block 840), and control proceeds to block 810 to wait for an image frame.

Because the example blocks 815, 820, 825 and 830 are repeated for each image frame, different pre-distortion maps can be used for different image frames, eyes, pixels, etc. Thus, even if the image did not change from one frame to the next, different pre-distorted images may be displayed.

Figure 9:
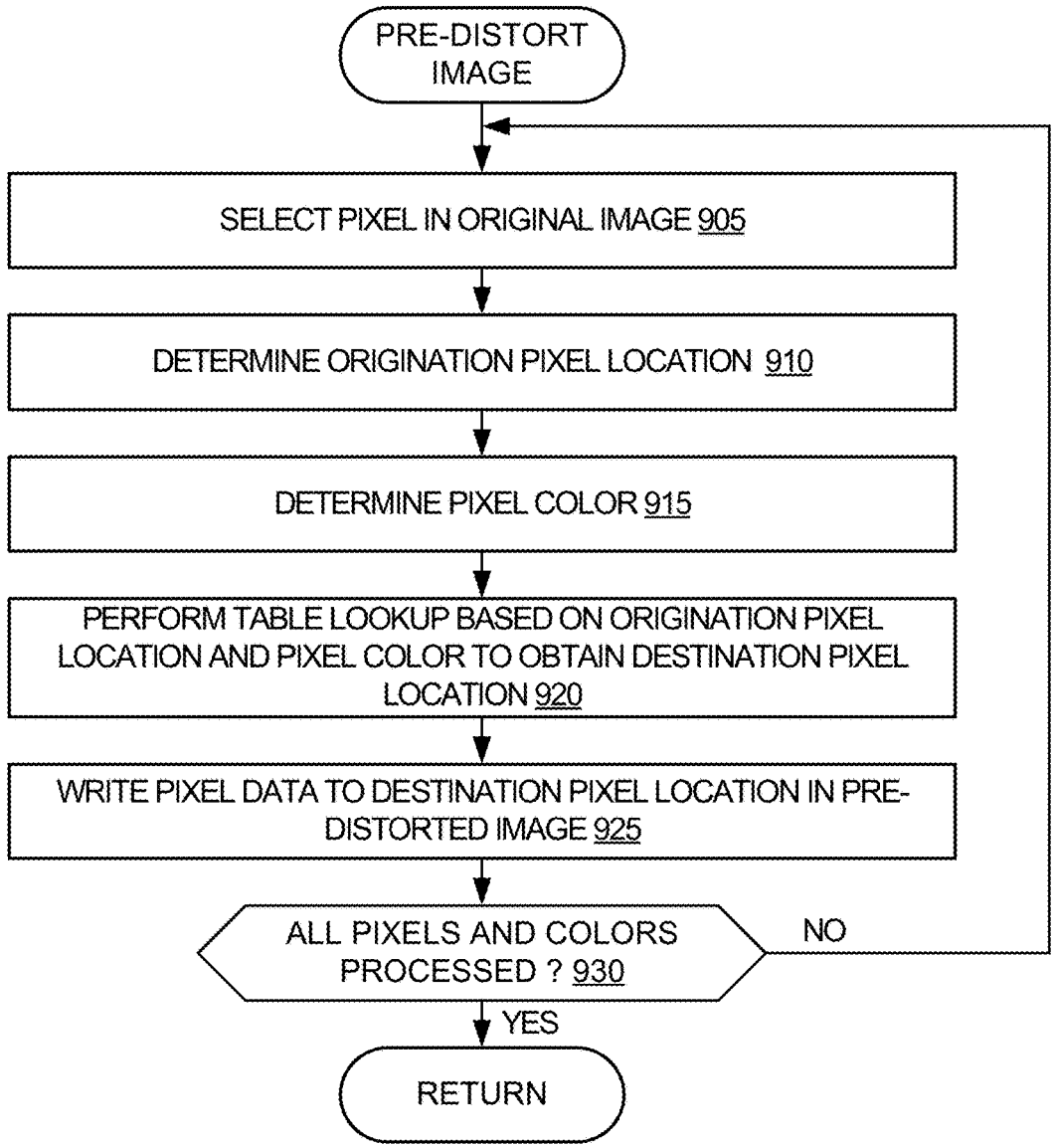
FIG. 9 is a flowchart illustrating an example method that may, for example, be implemented using machine-readable instruction executed by one or more processors to distort an image using a pre-distortion map.

FIG. 9 is a flowchart of an example method 900 that may be performed to pre-distort an image. The example method 900 may be used to, for example, implement block 825 of the example method 800 of FIG. 8. The example method 900 includes selecting a pixel in an image to be pre-distorted (block 905), determining the original pixel location for the selected pixel (block 910), and determining color data for the original pixel location (block 915). A table lookup of a pre-distortion map (see FIG. 13) based on the pixel location and color is performed to obtain a destination pixel location (block 920). The selected colored pixel data is moved from the original pixel location to the destination pixel location (block 925). If all pixels and colors have been processed (block 930), control returns from the example method of FIG. 9 to, for example, block 830 of FIG. 8. If not all pixels and colors have been processed (block 930), control returns to block 905 to select another pixel.

Figure 10:
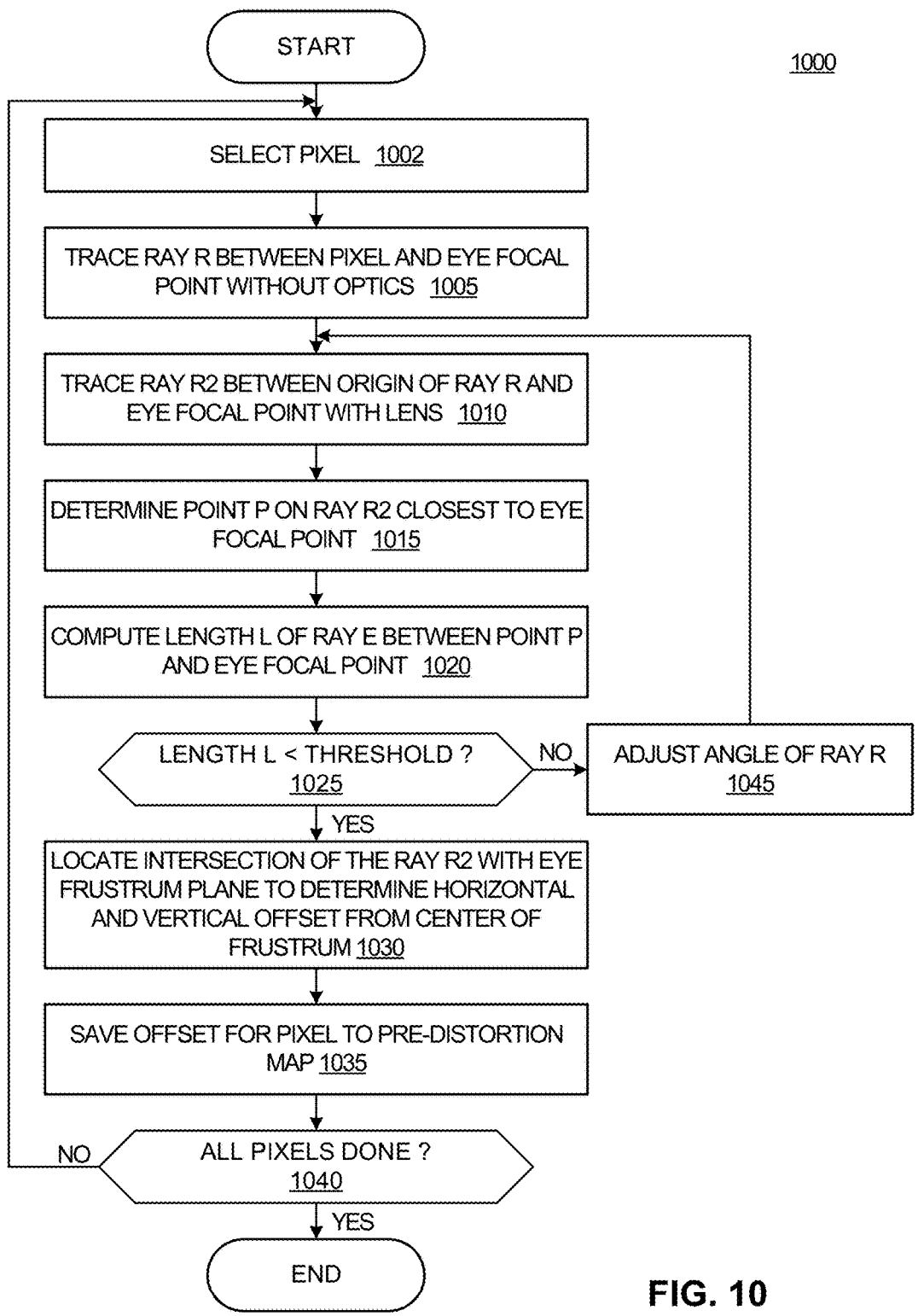
FIG. 10 is a flowchart illustrating an example method that may, for example, be implemented using machine-readable instructions executed by one or more processors to determine a pre-distortion.
Figure 11A:
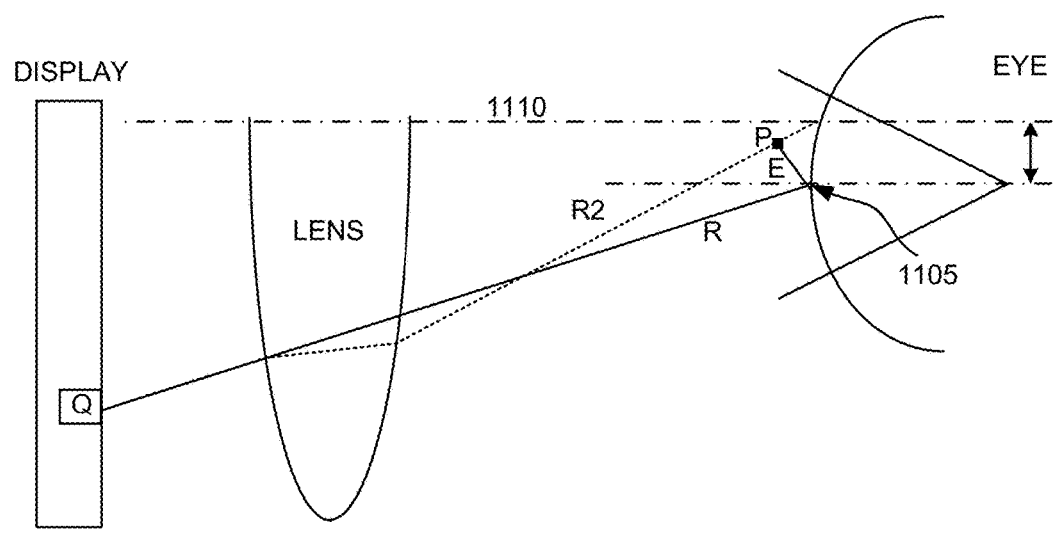
FIGS. 11A and 11B illustrate example ray tracings that may be used to determine a pre-distortion.

Turning to FIG. 10, an example method 1000 that may be performed to compute a pre-distortion map for an HMD is shown. The example method 1000 includes selecting a first pixel Q (block 1002), and tracing (e.g., computing) a ray R (see FIG. 11A) between the pixel Q and point 1105 at a center of a user's pupil (e.g., eye point) without optics and, thus, without considering any optic effects (block 1005).

A second ray R2 (see FIG. 11A) between the pixel Q for a currently considered color is traced through the lens, considering the effects of the optics (block 1010). Because the eye point 1105 of the user's pupil is below the optical axis 1110 of the lens and display, the example ray R2 impinges the eye above the eye point 1105. Optics can include any component or element (lens, mirror, separation(s), placement(s), color channel frequencies, geometry(-ies), refractive index(-ices), etc.) of the HMD that affects the direction that light takes in the HMD between display and eye. According to Fermat's principle, the second ray R2 is the path taken by light from the pixel Q through the optics (e.g., lens), taking into consideration the effects of the optics, to the eye point 1105 that can be traversed in the least time.

A point P (see FIG. 11A) on the ray R2 closest to eye point 1105 of the pupil is determined (block 1015). The length L of a ray E (see FIG. 11A) between the point P and the eye point 1105 of the pupil is computed (block 1020). If the length L is less than a threshold (block 1025), the intersection of the ray R2 with the base plane of the eye frustum (that is, the origination point of the ray R2 and the ray R at the display) is used to determine a pre-distortion map offset for the pixel Q and the currently considered color (block 1030). The offsets are saved to the pre-distortion map as, for example, shown in FIG. 13 (block 1035). If all pixel/color combinations of both eyes have been processed (block 1040), control exits from the example method 1000 of FIG. 10. If not all pixel/color combinations have been processed (block 1040), control returns to block 1005 to select the next pixel/color combination (block 1005).

Figure 11B:
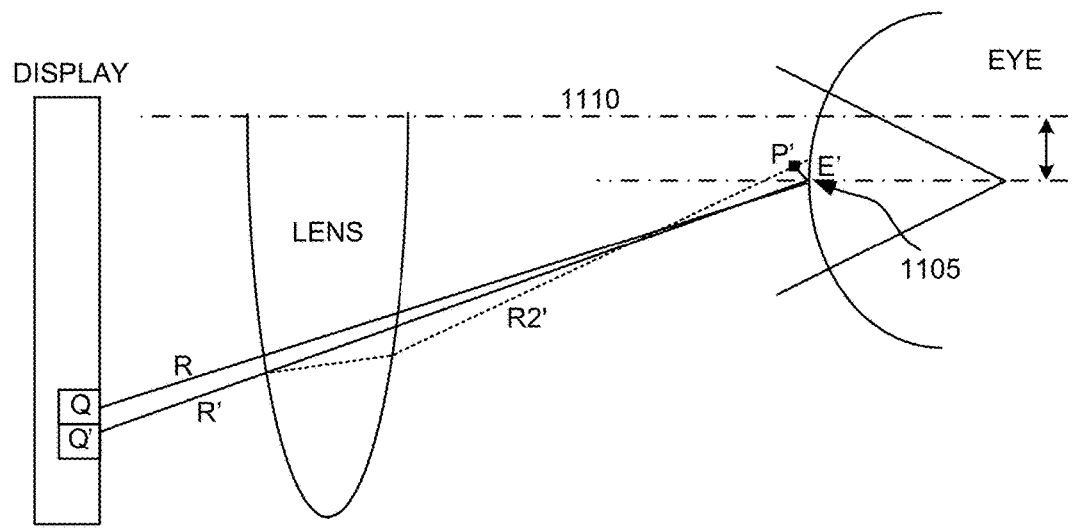

Returning to block 1025, if the length L is not less than the threshold (block 1025), the angle of the ray R is adjusted forming ray R' (block 1045) and control returns to block 1010 to trace ray R2' from the origin of R' (see FIG. 11B), and determine new point P' (block 1015), new ray E' (block 1020) and new length L' (block 1020). In some examples, the angle of the adjusted starting ray R' is changed by an angle theta=tan-1 (E/(distance from eye point to display)). In some examples, Newton's method is used to iteratively find the correct ray R by reducing the offset theta of the adjusted R' by half each iteration.

The example methods 900 and 1000, or other methods disclosed herein, may, for example, be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example methods 900 and 1000, or other methods disclosed herein may be embodied in program code and/or machine-readable instructions stored on a tangible and/or non-transitory computer-readable medium accessible by a processor, a computer and/or other machine having a processor, such as that discussed below in connection with FIG. 12. Machine-readable instructions comprise, for example, instructions that cause a processor, a computer and/or a machine having a processor to perform one or more particular processes. Many other methods of implementing the example methods 900 and 1000, or other methods disclosed herein may be employed. For example, the order of execution may be changed, and/or one or more of the blocks and/or interactions described may be changed, eliminated, sub-divided, or combined. Additionally, any of the entire example methods 900 and 1000, or other methods disclosed herein may be carried out sequentially and/or carried out in parallel by, for example, separate processing threads, processors, devices, discrete logic, circuits, etc.

As used herein, the term "computer-readable medium" is expressly defined to include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the example network 140 may be constructed using any number and type(s) of private and/or public networks including, but not limited to, the Internet, a cellular data network, a coaxial cable network, a satellite network, a fiber optic network, a dialup or broadband modem over a telephone network, a Wi-Fi® hotspot, a private communications network (e.g., a private local area network (LAN), a wireless local area network (WLAN), a leased line), etc., and any combination thereof.

The example system 100 of FIG. 1 further includes the VR content system 130. The VR content system 130 may represent a server device. The example VR content system 130 of FIG. 1 includes any number of repositories 132 storing content and/or virtual reality applications 134 that can generate, modify, and execute VR scenes.

The example HMD 110 of FIG. 1 may include, for instance, a VR headset, glasses, an eyepiece, or any other wearable device capable of light-emitting portioning VR content. In operation, the HMD 110 can, for example, execute a VR application 134 to playback, present, receive or process images for a user. However, images maybe played back, presented and light-emitting portioned by the HMD 110 without need for a VR application 134. In some implementations, a VR application 134 of the HMD 110 is hosted by one or more of the devices 126-128 shown in FIG. 1.

The one or more VR applications 134 of FIG. 1 can be configured to execute on any or all of the devices 110 and 126-128. The HMD 110 can be communicatively coupled to one or more of the devices 126-128 to access VR content stored on or accessible via the VR content system 130. The devices 126-128 can be communicatively coupled (wired and/or wirelessly) to the HMD 110.

The example HMD 110 may be wirelessly coupled to the devices 126-128 via any combination of wireless networks and/or protocols such as, but not limited to, any of the Institute of Electrical and Electronics Engineers (IEEE®) 802.11x family of standards, Wi-Fi®, Bluetooth®, etc.

In the event the HMD 110 is electrically coupled to one or more of the devices 126-128, a cable with an appropriate connector on either end for plugging into the devices 126-128 may be used. For example, the cable can include a Universal Serial Bus (USB) connector on both ends. The USB connectors can be the same USB type connector, or the USB connectors can each be a different type of USB connector. The various types of USB connectors include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

In some implementations, the mobile device 126 executes the VR application(s) 134 and provides the content for the VR environment. In some implementations, the laptop computing device 127 executes the VR application(s) 134 and provides content from one or more content servers (e.g., the VR content server 130). In some implementations, the desktop computing device 128 executes the VR application(s) 134 and provides content from one or more content servers (e.g., the VR content server 130). The one or more content servers 130 and one or more computer-readable storage devices 132 can communicate with the mobile device 126, the laptop computing device 127, and/or the desktop computing device 128 using the network 140 to provide content for the HMD 110.

Figure 12:
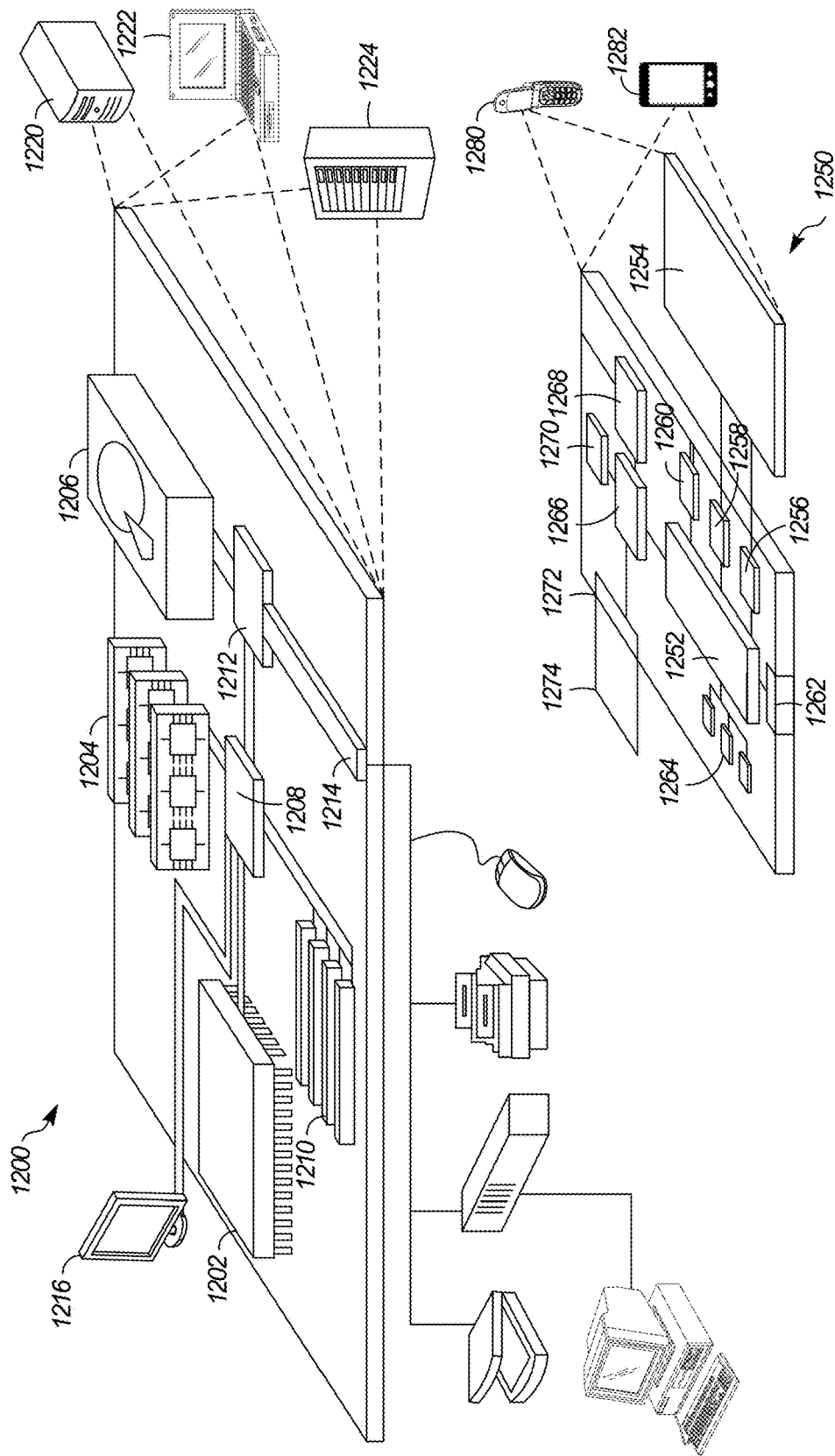
FIG. 12 is a block schematic diagram of an example computer device and an example mobile computer device that may be used to implement the examples disclosed herein.

Turning to FIG. 12, an example of a generic computer device 1200 and a generic mobile computer device 1250, which may be used with the techniques described here. The computing devices 1250 may be used to implement any of the devices disclosed herein including, but not limited to, HMD 100, the HMD 200, and the HMD 700. Computing device 1200 is intended to represent various forms of digital computers, such as laptops, desktops, tablets, workstations, personal digital assistants, televisions, servers, blade servers, mainframes, and other appropriate computing devices. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. The processor 1202 can be a semiconductor-based processor. The memory 1204 can be a semiconductor-based memory. Each of the components 1202, 1204, 1206, 1208, 1210, and 1212, are interconnected using various busses, connections, memories, caches, etc. and may be mounted on a common motherboard or in other manners as appropriate. The processor 1202 can process instructions for execution within the computing device 1200, including instructions stored in the memory 1204 or on the storage device 1206 to light-emitting portion graphical information for a GUI on an external input/output device, such as light-emitting portion 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, light-emitting portion 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, Wi-Fi) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a light-emitting portion 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and light-emitting portion interface 1256 coupled to a light-emitting portion 1254. The light-emitting portion 1254 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface 1256 may comprise appropriate circuitry for driving the light-emitting portion 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single Inline Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory 1264, expansion memory 1274, or memory on processor 1252 that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
    determining a position of a pupil relative to a lens of a head-mounted display (HMD);
    determining, based on the determined position, a pre-distortion map for an image to be displayed on a display screen of the HMD associated with the pupil, including:
        computing a first ray through a lens between a first pixel location of the display screen and the pupil, wherein the first ray defines a shortest distance between the first pixel location and the pupil;
        computing a second ray through the lens between the first pixel location and the pupil, wherein the second ray defines a shortest travel time for light from the first pixel location, through the lens, to the pupil, wherein a first portion of the first ray from the first pixel location to a surface of the lens is identical to a second portion of the second ray from the first pixel location to the surface of the lens; and
        adjusting the first pixel location to a second pixel location based on a separation of the first ray and the second ray at the pupil; and
    displaying the image on the display screen of the HMD, wherein the image is modified by the pre-distortion map.

2. The method of claim 1, wherein determining the pre-distortion map includes determining the pre-distortion map to compensate for a chromatic aberration of a lens between the pupil and the display screen.

3. The method of claim 2, wherein displaying the image modified by the pre-distortion map on the display screen of the HMD includes displaying for a first pixel of the display screen a first color offset by a first offset relative to a first location, and a second color to be displayed offset by a second offset relative to a second location, the second color different from the first color, and the second offset different from the first offset.

4. The method of claim 1, wherein displaying the image modified by the pre-distortion map on the display screen of the HMD includes displaying a pixel of the image at a first location on a display screen rather than at a second position, wherein the pixel would be displayed at the second position but for the modification of the image by the pre-distortion map.

5. The method of claim 1, wherein the first ray and the second ray are computed for a first color component of light.

6. The method of claim 5, further comprising, for a second color component of light:
computing a third ray through the lens between the first pixel location and the pupil, wherein the third ray defines a shortest travel time for light from the first pixel location, through the lens, to the pupil; and
adjusting the first pixel location to a third pixel location for the second color component of light based on a separation of the third ray and the first ray at the pupil, while adjusting the first pixel location to the second pixel location for the first color component of light based on a separation of the second ray and the first ray at the pupil.

7. The method of claim 1, wherein the determining the pre-distortion map based on the position comprises selecting the pre-distortion map from a database based on the position.

8. The method of claim 1, wherein the determining the pre-distortion map based on the position comprises:
selecting two pre-distortion maps from a database based on the position; and
interpolating between the two pre-distortion maps.

9. The method of claim 1, wherein determining the position of the pupil and determining the pre-distortion map are performed for a first video frame, and further comprising, for a second video frame:
determining a second position of the pupil in the HMD relative to the lens;
determining, based on the determined second position a second pre-distortion map for a second image to be displayed on the display screen of the HMD associated with the pupil; and
displaying the second image on the display screen of the HMD, wherein the second image is modified by the second pre-distortion map.

10. The method of claim 1, wherein determining the position of the pupil includes tracking a location of a position of the pupil over time.

11. A head-mounted display (HMD) comprising:
a lens;
an eye tracker to determine a position of a pupil relative to the lens;
a processor programmed to determine, based on the determined position, a pre-distortion map for an image to be displayed on a display screen associated with the HMD and with the pupil by:
determining a direct path through the lens between a first pixel location of the display screen and an eye point of the pupil, wherein the direct path is a straight line between the first pixel location and a first point on the pupil;
distorting the direct path based on the lens to determine a distorted path and a second point on the pupil; and
adjusting the first pixel location to a second pixel location based on a separation of the first point and the second point; and
a display to display the image on the display screen associated with the HMD, wherein the image is modified by the pre-distortion map.

12. The HMD of claim 11, further comprising a memory storing a database, wherein the processor is programmed to determine the pre-distortion map by selecting the pre-distortion map from the database based on the position.

13. The HMD of claim 12, wherein the database is at least one of pre-stored into the HMD, or computed by the processor.

14. The HMD of claim 11, wherein the processor is programmed to determine the pre-distortion map by computing the pre-distortion map based on the determined position.

15. The HMD of claim 11, wherein the processor includes a graphics processing unit configured to determine the pre-distortion map for each video frame.

16. A non-transitory machine-readable media storing machine-readable instructions that, when executed, cause a machine to at least:
determine a position of a pupil in a head-mounted display (HMD) relative to a lens;
determine, based on the determined position, a pre-distortion map for an image to be displayed on a display screen of the HMD associated with the pupil by:
determining a direct path through optics of the HMD between a first pixel location of the display screen and an eye point of the pupil, wherein the direct path is a straight line between the first pixel location and a first point on the pupil;
distorting the direct path based on the optics of the HMD to determine a distorted path and a second point on the pupil; and
adjusting the first pixel location to a second pixel location based on a separation of the first point and the second point; and
display the image on the display screen of the HMD, wherein the image is modified by the pre-distortion map.

17. The non-transitory media of claim 16, wherein the machine-readable instructions, when executed, cause the machine to determine the pre-distortion map by determining the pre-distortion map to compensate for at least one of a chromatic aberration of a lens between the pupil and the display screen, or a position of the pupil relative to the lens being different from an anticipated position of the pupil.

* * * * *